United States Patent [19]

Goto

[11] Patent Number: 4,667,077
[45] Date of Patent: May 19, 1987

[54] COMPACT ASSEMBLY FOR A WIRE CUTTING TYPE ELECTRICAL DISCHARGE MACHINING SYSTEM

[75] Inventor: Makoto Goto, Toki, Japan
[73] Assignee: Brother Kogyo Kabushiki Kaisha, Japan
[21] Appl. No.: 708,872
[22] Filed: Mar. 6, 1985
[30] Foreign Application Priority Data Mar. 13, 1984 [JP] Japan .............................. 59-36430[U]

[51] Int. Cl.⁴ ............................................... B23H 7/02
[52] U.S. Cl. ................................. 219/69 W; 219/69 R
[58] Field of Search ............... 219/69 W, 69 E, 69 M, 219/69 R, 69 C

[56] References Cited

U.S. PATENT DOCUMENTS

| 4,084,074 | 4/1978 | Gilleland et al. | 219/69 W |
| 4,363,949 | 12/1982 | Pfau et al. | 219/69 W |
| 4,463,241 | 7/1984 | Smith | 219/69 W |
| 4,521,661 | 6/1985 | Inoue | 219/69 R |

FOREIGN PATENT DOCUMENTS 56-76340  6/1981  Japan ................................ 219/69 W

OTHER PUBLICATIONS

"EDM Technology Machines", by EDM Technology Inc., p. 7 of *EDM Digest*, Jan./Feb. 1984.
Seibu-Eltee, "*EW*-400 *and EW*-600", Mar. 3, 1982.
"EDM Method of Producing Small Holes", by Bredemeyer, pp. 20-26 of EDM Digest May/Jun. 1983.
"Affordable Traveling Wire", by Raycom Corp., p. 6 of EDM Digest, Nov./Dec. 1984.

*Primary Examiner*—Philip H. Leung
*Assistant Examiner*—Geoffrey S. Evans
*Attorney, Agent, or Firm*—Parkhurst & Oliff

[57] ABSTRACT

A wire cutting type electrical discharge machining system compactly assembled due to improved arrangement. It includes a frame, a vertical column with upper and lower arms, a bed for supporting a feed device for an electrically conductive workpiece, and a vertically elongate mounting plate. The mounting plate secured, at a lateral part thereof on one of opposite surfaces thereof, to the rear side of the column is provided with a wire supply/take-up assembly mounted on the same surface where it is fixed to the column. On the other surface of the mounting plate a box accommodating an electrical discharge controller is fixed. This arrangement is helpful in facilitating the assemblying operation of the system, in good use of a possibly formed dead space above the bed, and further in simplifying the wire path by arranging the wire supply unit in alignment with the upper arm, and the wire tape-up unit in alignment with the lower arm.

8 Claims, 3 Drawing Figures

COMPACT ASSEMBLY FOR A WIRE CUTTING TYPE ELECTRICAL DISCHARGE MACHINING SYSTEM

FIELD OF THE INVENTION

This invention relates to a wire cutting type electrical discharge machining system for removing metal by means of an electrical discharge energy between an electrically conductive workpiece and an electrode in the form a metallic wire which is continuously fed lengthwise relative to the workpiece.

BACKGROUND OF THE INVENTION

In this category of the wire cutting type electrical discharge machining system, there is installed a wire supply assembly for supplying the wire electrode to a machining space, and a wire take-up assembly for taking up the wire electrode from the space. In the traditional way of assemblying the electrical discharge machining system of this sort, the wire supply assembly and the wire take-up assembly have respectively been equipped at a different place in a frame of the system, and moreover an electrical discharge controller was disposed at a separated place from the frame. The mounting operation of these supply assembly, take-up assembly, and electrical discharge controller onto the system was therefore time-consuming and not good in its operability. Another problem was a large space they necessarily occupied.

SUMMARY OF THE INVENTION

It is accordingly an important object of this invention, which was made from such a background, to provide an improved wire cutting type electrical discharge machining system wherein the wire supply assembly, the wire take-up assembly, and the electrical discharge controller are fixed on a mounting plate before being secured to the frame of the system in a prearranged state, so as to facilitate the assemblying operation as well as to make the system compact in size.

According to the present invention there is provided a wire cutting type electrical discharge machining system which comprises; (a) an electrical discharge controller for applying a voltage between a wire electrode and an electrically conductive workpiece to induce an electrical discharge therebetween, (b) a feed device for relatively moving the workpiece and the wire electrode to each other in a horizontal plane, (c) a frame including a vertical column for guiding the wire electrode, and further including a bed fixed to a lower end of the vertical column to support the feed device, and (d) a mounting plate which is secured to the frame, and which carries on one of opposite surfaces thereof a wire supply/take-up assembly for feeding the wire electrode relative to the workpiece, and carries on the other surface thereof the electrical discharge controller.

In the wire cutting type electrical discharge machining system constructed as described above, the wire supply take-up assembly and the selectrical discharge controller can be secured to a frame in a collectively fixed state onto a mounting plate, which greatly facilitates the assemblying operation of the whole system as well as makes the system itself compact in size in comparison with the prior art, wherein the electrical discharge controller was obliged to be separately placed from the frame.

According to an advantageous embodiment of the invention, the bed extends laterally from one of lateral sides of the vertical column. The mounting plate consisting of a vertically elongate plate is secured, at a lateral end part of one of opposite surfaces thereof, to a rear side of the vertical column. The wire supply/take-up assembly is mounted on a remaining part of the one surface of the mounting plate. The electrical discharge controller is preferably accommodated in a box, which is secured to the other surface of the mounting plate. A portion of the box may protrude laterally from the edge of the lateral end part of the mounting plate such that the portion of the box is located behind the rear side of the vertical column. By means of taking such an arrangement, a dead space inevitably exists behind the vertical column can be effectively utilized for installing therein the electrical discharge controller.

According to an advantageous embodiment of this invention, the vertical column has an upper arm extending laterally from an upper end part of the one lateral side of the vertical column, and further has a lower arm which extends laterally in parallel and in downwardly spaced relation with the upper arm. A work pan for accommodating machining fluid and the workpiece is mounted on the bed via the feed device and has an aperture in one side wall thereof. The lower arm extends fluid-tightly through the aperture into the work pan. The work pan and the lower arm are relatively movable in a horizontal plane. The wire supply/take-up assembly comprises a wire supply unit from which the wire electrode is supplied to the workpiece, and a wire take-up unit for taking up the wire electrode. The wire electrode is directed from the wire supply unit into the work pan while passing through the interior of the upper arm, and taken up by the wire take-up unit while passing through the interior of the lower arm.

By means of taking such a construction, the upper and lower arms can be utilized as the passage for passing the wire electrode therethrough, which contributes to simplification of the structure of the system, with beneficial results of giving the system a good and neat appearance as well as lowering the manufacturing cost of the system.

A vertically elongate mounting plate, being secured at a lateral end portion on one surface thereof to the rear side of the column, and having on the remaining portion of the same surface thereof a wire supply unit and a wire take-up unit attached thereon such that both are respectively located on a prolongation from the root portion of the upper arm and from the root portion of the lower arm, makes it possible, with the cooperation of the above described arrangement, to introduce the wire electrode straightly from the wire supply unit into the upper arm and to pull out the wire electrode straightly from the lower arm towards the wire take-up unit. It will make the path of the wire electrode simple, by decreasing curved places, reducing thereby the number of needed wire guides that much.

BRIEF DESCRIPTION OF THE DRAWING

The aforementioned and other objects and features of the invention as well as advantages thereof will become more readily apparent from the following description taken with reference to the accompanying drawing in which.

DETAILED DESCRIPTION OF THE PREFERRED EMBODIMENT

Figure 1:
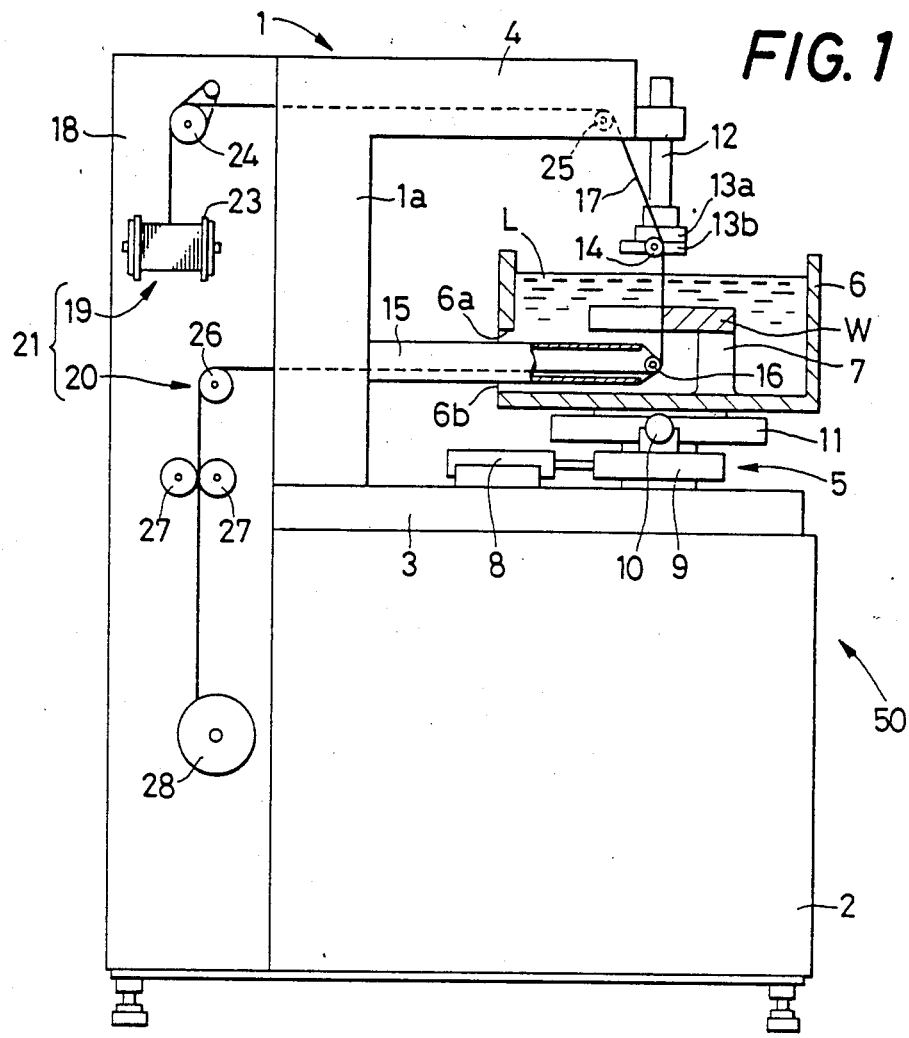
FIG. 1 is an elevation, partly being a cross section, of an embodiment of a wire cutting type electrical discharge machining system according to this invention.

A frame 50 of a wire cutting type electrical discharge machining system, in FIG. 1, is provided with a base 2, a bed 3 disposed thereon, and a vertical column 1 firmly erected on the bed 3.

On the bed 3 a work pan 6 is mounted by way of a feed device or table feeding assembly 5. On the bottom wall of the work pan 6 which is filled with a machining fluid L a work table 7 is secured for holding an electrically conductive workpiece W. The table feeding assembly 5 is provided with a first slide 9 which is laterally movable in a horizontal plane owing to a first feed motor 8 and a second slide 11 which is disposed on the first slide 9 movable in a forward and a backward direction in a horizontal plane owing to a second feed motor 10, and displacement of both, the first and second slides (9, 11), causes the work pan 6 to be moved, which naturally makes it possible to displace the workpiece W in any desired direction in a horizontal plane.

The vertical column 1 is provided with a main body 1a extending vertically, for protruding therefrom horizontally at the upper end thereof an upper arm 4 and similarly protruding therefrom a lower arm 15 substantially in parallel with and below the upper arm 4. On the tip of the upper arm 4 a height adjustable head 12 is attached. The head 12 sustains thereunder a third slide 13a which is movable in a forward and a backward direction in a horizontal plane, which sustains in turn thereunder a fourth slide 13b which is laterally movable in a horizontal plane. On the fourth slide 13b an upper electrode guide 14 with an electrically conductive roller is attached in an electrically insulated state with respect to the fourth slide 13b. The upper electrode guide 14 is movable in a vertical direction in response to ascending and descending of the head 12. Displacement of the third slide 13a and the fourth slide 13b, actuated by a respective drive means such as a pulse motor, (not shown) in a horizontal direction assures the upper electrode 14 of a movement in any desired direction in a horizontal plane.

The lower arm 15, a tubular member, horizontally extends into the work pan 6 through an elongate aperture 6a formed in one side wall thereof so as to reach as far as below the workpiece W. On the tip of the lower arm 15 a lower electrode guide 16 with an electrically conductive roller is attached in an electrically insulated state with respect to the lower arm 15. The elongate aperture 6a is fluid-tightly sealed with a sealing means 6b which permits a relative movement in a horizontal direction between the work pan 6 and the lower arm 15. The sealing means 6b in this instance will not be explained here, because a similar one is described in great detail with a drawing in the specification of the U.S. patent application Ser. No. 705,518 filed Feb. 19, 1985, and the explanation thereof is not necessarily indispensable for the understanding of this invention.

The wire electrode 17, a metallic wire, is guided in a vertical direction by the upper electrode guide 14 and the lower electrode guide 16. The upper electrode guide 14 can be adjusted in its relative height to the lower electrode guide 16 due to its ascending and descending operation, and the portion of the wire electrode 17 defined between the two guiding points of the upper electrode guide 14 and the lower electrode guide 16 can be adjusted, in respect to its angle against the top surface of the table 7, through displacement of the upper electrode guide 14 in a horizontal plane.

Figure 2:
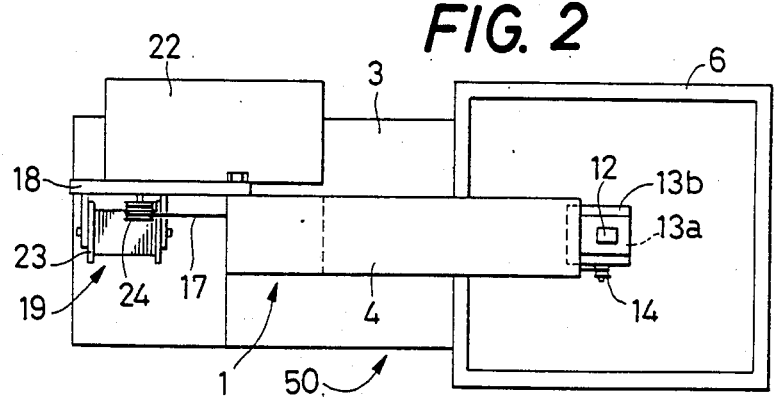
FIG. 2 is a plan view of the system in FIG. 1.

On the rear side of the main body 1a of the vertical column 1 a mounting plate 18 is secured on the left side (FIG. 2.) The mounting plate 18 is a flat plate elongate in the vertical direction and secured to the rear side of the main body 1a of the vertical column 1 at a lateral end part on one of opposite surfaces thereof as can be seen in FIG. 2. On the same surface of the mounting plate 18, where it is secured to the vertical column 1, a wire supply/take-up assembly 21 consisting of a wire supply unit 19 for feeding the wire electrode 17 and a wire take-up unit 20 for taking up the wire electrode 17 is mounted. On the other surface of the mounting plate 18 a box 22 containing an electrical discharge controller is secured.

The wire supply unit 19, consisting of a supply reel 23 for feeding the wire electrode 17 and a tension roller 24 for giving tension to the wire electrode 17 fed from the reel 23, is mounted at an upper portion of the mounting plate 18. The wire take-up unit 20 which is constituted of a guide roller 26, a pair of pinch rollers 27 driven by a motor, gears, etc. (not shown), and a take-up roller 28 rotatably driven by a motor, (not shown) is mounted near the middle portion of the mounting plate 18, i.e., below the wire supply unit 19. The metallic wire electrode 17 supplied from the supply reel 23 is continuously fed, in a tense state under the tension given by the tension roller 24, passing through the interior of the upper arm 4, and then introduced to, passing through a guide roller 25 disposed in the upper arm 4 and guided by the upper electrode guide 14, the machining space in the work pan 6. It further travels, via the lower electrode guide 16 and the interior of the lower arm 15, to the take-up roller 28. Over the mounting plate 18 a semitransparent cover (not shown) is disposed so as to cover the various members mounted thereon.

Figure 3:
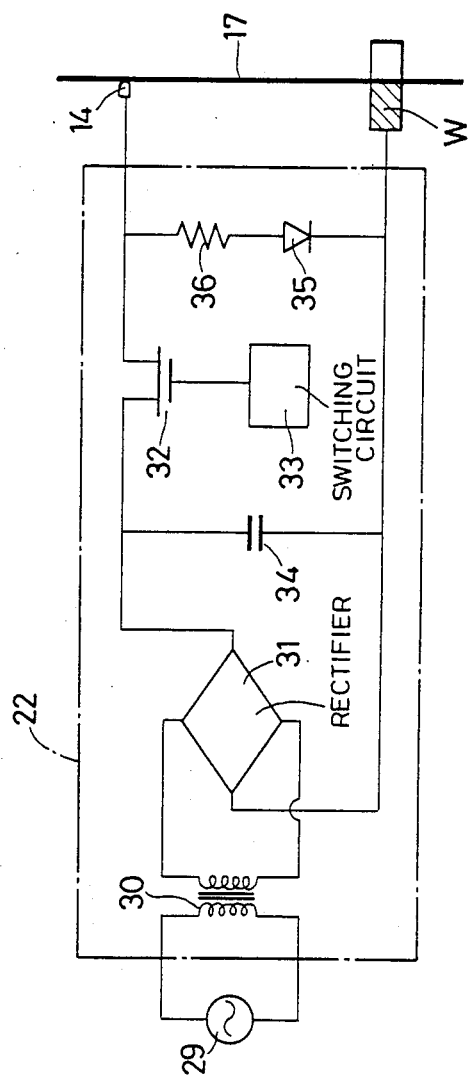
FIG. 3 is a circuit diagram for the electrical discharge controller of the system.

The box 22 partially protrudes sidewardly beyond the mounting plate 18, when it is fixed thereon, from that portion thereof, as shown in FIG. 2, where the mounting plate 18 is secured onto the vertical column 1. The extended or protruded portion of the box 22 beyond the mounting plate 18 faces the rear side of the vertical column 1. An electric circuit for the electrical discharge controller accommodated in the box 22 is of a construction shown in FIG. 3. Between input terminals of a transformer 30 is connected an AC power source 29, and between the output terminals of the transformer 30 a rectifier 31 is connected. To one output terminal of the rectifier 31 the source terminal of a field-effect transistor 32 is connected, to the gate terminal thereof a switching circuit 33 for controlling the switching operation of the field-effect transistor 32 is connected. Between the source terminal of the field-effect transistor 32 and the other output terminal of the rectifier 31 a condenser 34 for stabilizing the power supply to the field-effect transistor 32 is connected, and between the drain terminal of the field-effect transistor 32 and the other output terminal of the rectifier 31 a diode 35 and a resistor 36, for erasing the reactance generated due to the switching operation of the field-effect transistor 32, are connected. The wire electrode 17 is, via the upper electrode guide 14, connected to the side of the drain terminal of the field-effect transistor 32; and the workpiece W is connected to the side of the other terminal of the rectifier 31.

In this embodiment of the wire cutting type electrical discharge machining system of this invention the box 22, in which the electrical discharge controller is accommodated, and the wire supply/take-up assembly 21 are mounted in a collective style to the mounting plate 18, which in turn is secured to the frame 50 as it is. This way of mounting of the wire supply/take-up assembly 21 and the electrical discharge controller in a collective and compact state allows the assemblying of the whole system to be easy and compact in size. It also greatly facilitates the electrical wiring of the system through the compact and simple arrangement as mentioned above.

Another merit of this assemblying style resides in that a possible dead space, formed behind the vertical column 1 due to the size difference, in section, between the bed 3 and the vertical column 1, can be effectively utilized by means of fixing the box 22 on the mounting plate 18 such that it partially faces the rear side of the vertical column 1.

Still another merit of this embodiment can be derived from the above-mentioned arrangement style, wherein the mounting plate 18 is secured on the rear side of the main body 1a of the vertical column 1, and the wire supply/take-up assembly 21 is fixed on the same surface of the mounting plate 18, at which the mounting plate 18 is secured to the vertical column 1. In other words, the wire supply/take-up assembly 21 is located in alignment with the vertical column 1, as illustrated in FIG. 2, and the wire supply unit 19 situated at the upper portion of the mounting plate 18 corresponds to the upper arm 4 and the wire take-up unit 20 situated in the middle part of the mounting plate 18 downwardly spaced from the wire supply unit 19 nearly corresponds to the lower arm 15, which is helpful in simplifying the path of the wire electrode 17 from the wire supply unit 19 to the upper arm 4 and from the lower arm 15 to the wire take-up unit 20.

While we have described and illustrated specific embodiment of this invention, it will be clear that variations of the details of construction which are specifically illustrated and described may be resorted to without department from the true spirit and scope of the invention as defined in the appended claims.

What is claimed is:

1. A wire cutting type electrical discharge machining system for removing metal by means of an electrical discharge energy between an electrically conductive workpiece and an electrode in the form of a metallic wire which is continuously fed lengthwise relative to the workpiece, comprising:
    a power controller consisting of an electrical voltage controller for applying a voltage between the wire electrode and the workpiece to induce an electrical discharge therebetween, said electrical voltage controller being the sole power controller;
    a feed device for moving said workpiece and said wire electrode relative to each other in a horizontal plane;
    a frame, including a vertical column for guiding said wire electrode, and further including a bed fixed to a lower end of said vertical column to support said feed device; and
    a mounting plate removably secured to said frame in a parallel relationship with said vertical column and having opposite surfaces, one of said opposite surfaces carrying a wire supply/take-up assembly for feeding said wire electrode relative to the workpiece, the other surface of said mounting plate carrying said electrical voltage controller, whereby said mounting plate is removably secured to facilitate easy access to said wire supply/take-up assembly and said electrical voltage controller.

2. The electrical discharge machining system of claim 1, wherein said bed extends laterally from one lateral side of said vertical column, said mounting plate comprises a vertically elongate plate secured at a lateral end part of said one of said opposite surfaces to a rear side of said vertical column, and said wire supply/take-up assembly is mounted on a remaining part of said one of said opposite surfaces of said mounting plate.

3. The electrical discharge machining system of claim 2, wherein said electrical voltage controller is accommodated in a box secured to said other surface of said mounting plate, a portion of said box protruding laterally from the edge of said lateral end part of said mounting plate such that said portion of said box is located behind said rear side of said vertical column.

4. The electrical discharge machining system of claim 1, wherein said vertical column has an upper arm extending laterally from an upper end part of one lateral side of said vertical column, and further includes a laterally extending lower arm extending in a parallel and downwardly spaced relation with said upper arm.

5. The electrical discharge machining system of claim 4, further comprising a work pan mounted on said feed device, said feed device having an aperture in one side wall thereof, and said lower arm extending through said aperture into said work pan in a fluid-tight relationship.

6. The electrical discharge machining system of claim 1, further comprising a work pan mounted on said feed device to accommodate the workpiece, and wherein said wire supply/take-up assembly comprises a wire supply unit for supplying said wire electrode to the workpiece, and a wire take-up unit for taking up said wire electrode, said wire electrode being directed from said wire supply unit into said work pan after passing through an interior portion of said upper arm, and taken up by said wire take-up unit after passing through an interior portion of said lower arm.

7. The electrical discharge machining system of claim 6, wherein said bed extends laterally from one lateral side of said of said vertical column, said mounting plate comprises a vertically elongate plate secured at a lateral end part of said one of said opposite surfaces to a rear side of said vertical column, said wire supply/take-up assembly being mounted on a remaining part of said one of said opposite surfaces of said mounting plate.

8. The electrical discharge machining system of claim 7, wherein said electrical voltage controller is accommodated in a box secured to said other surface of said mounting plate, a portion of said box protruding laterally from the edge of said lateral end part of said mounting plate such that said portion of said box is located behind said rear side of said vertical column.

* * * * *